United States Patent
Okada et al.

(10) Patent No.: US 6,840,041 B2
(45) Date of Patent: Jan. 11, 2005

(54) TORQUE CONVERTER

(75) Inventors: Katsuhiko Okada, Shizuoka (JP); Toshiaki Noda, Kanagawa (JP); Keichi Tatewaki, Shizuoka (JP)

(73) Assignee: JATCO Ltd, Fuji (JP)

( * ) Notice: Subject to any disclaimer, the term of this patent is extended or adjusted under 35 U.S.C. 154(b) by 84 days.

(21) Appl. No.: 10/252,092

(22) Filed: Sep. 23, 2002

(65) Prior Publication Data

US 2003/0061809 A1 Apr. 3, 2003

(30) Foreign Application Priority Data

Sep. 28, 2001 (JP) ........................................ 2001-303912

(51) Int. Cl.$^7$ ............................................. F16H 41/26
(52) U.S. Cl. ..................................... 60/361; 416/197 C
(58) Field of Search .......................... 60/330, 345, 361, 60/364, 365; 416/180, 197 C

(56) References Cited

U.S. PATENT DOCUMENTS

| | | | | |
|---|---|---|---|---|
| 3,888,082 A | * | 6/1975 | Haide | ........................... 60/361 |
| 4,624,105 A | * | 11/1986 | Nishimura et al. | ............ 60/361 |
| 4,866,935 A | * | 9/1989 | Hayabuchi et al. | ............ 60/361 |
| 5,058,027 A | * | 10/1991 | Becraft | ......................... 60/330 |
| 5,152,139 A | * | 10/1992 | Becraft | ......................... 60/361 |
| 5,313,793 A | * | 5/1994 | Kirkwood et al. | ............. 60/361 |
| 5,487,003 A | * | 1/1996 | Iwasawa et al. | ............... 60/361 |
| 6,003,311 A | * | 12/1999 | Takada et al. | ................. 60/362 |

* cited by examiner

Primary Examiner—Thomas E. Lazo
(74) Attorney, Agent, or Firm—Foley & Lardner LLP

(57) ABSTRACT

In a torque converter comprised of three major rotating elements, namely a pump impeller formed integral with a converter cover, a turbine runner to which a driving power is transmitted through a working fluid from the pump impeller, and a stator disposed between the pump impeller and the turbine runner, the stator is supported on a transmission case via a one-way clutch and has a plurality of stator blades. In order to balance the enhanced vehicle's startability and improved fuel economy at idle, the ratio W/D of a stator-blade axial length W to a torque-converter nominal diameter D is set to satisfy a predetermined inequality $0.030 \leq W/D \leq 0.052$.

7 Claims, 4 Drawing Sheets

LEADING EDGE R

GREATER AXIAL LENGTH W

SMALLER AXIAL LENGTH W

TORQUE CONVERTER

TECHNICAL FIELD

The present invention relates to a torque converter into which a driving power is transferred from a driving power source such as an engine, and specifically to technologies for enhancing operating characteristics of a torque converter such as reduced torque capacity coefficient and increased torque ratio at stall.

BACKGROUND ART

Torque converters generally utilize three major rotating elements, namely a pump impeller (a driving member), a turbine runner (a driven member), and a stator located at the inner portion of the converter between the pump impeller and the turbine runner. The three major rotating elements cooperate with each other to provide oil circulation passage within the converter unit. Concretely, during operation of the driving power source (engine), the pump impeller is driven by input torque from the power source. When the engine is running and thus the pump impeller is rotating, the working fluid or working oil is pumped from the impeller blades across to the turbine blades, then back to the pump impeller via the stator for torque transmission from the impeller to the turbine.

SUMMARY OF THE INVENTION

To provide a desirable design outlet slip angle of working oil flow from stator blades, an axial length of the stator is generally set at a value as long as possible. The longer axial length of the stator has a merit that it is possible to maintain (i) the outlet slip angle at stall wherein a speed ratio e of turbine runner speed to pump impeller speed is substantially "0" (e≈0) and (ii) the outlet slip angle obtained when the turbine runner speed approaches the pump impeller speed (for example, e≈0.8) almost at the same. However, the longer axial length of the stator has the following drawbacks. That is, the longer the axial length of the stator, the wider the stator blade area. The wider stator blade area results in an increase in frictional loss (energy loss) within the torque converter. This lowers a power transmission efficiency as well as a torque ratio, thus lowering the startability of the vehicle and increasing fuel consumption in particular at idle. Additionally, there is an increased tendency for a radius-of-curvature R of a leading edge of the stator blade to become greater due to the axial length of the stator. Such a greater radius-of-curvature R of the stator-blade leading edge facilitates smooth working oil flow along the stator blade surface when the turbine is in stall. A flow rate of working oil broken away the stator blade surface tends to reduce. As a whole, the flow rate of working oil tends to increase. This leads to the problem of a high torque capacity coefficient at stall, that is, increased fuel consumption at idle.

Accordingly, it is an object of the invention to provide a torque converter, capable of suppressing a fuel consumption rate at idle from increasing, while ensuring a high startability of an automotive vehicle.

In order to accomplish the aforementioned and other objects of the present invention, a torque converter comprises a converter cover to which a driving power is transmitted from a driving power source, a pump impeller formed integral with the converter cover, a turbine runner to which the driving power is transmitted through a working fluid from the pump impeller, a stator disposed between the pump impeller and the turbine runner and supported on a transmission case via a one-way clutch and having stator blades, and a ratio W/D of a stator-blade axial length W of the stator to a torque-converter nominal diameter D of the torque converter being set to satisfy a predetermined inequality $0.030 \leq W/D \leq 0.052$.

According to another aspect of the invention, a torque converter comprises a converter cover to which a driving power is transmitted from a driving power source, a pump impeller formed integral with the converter cover, a turbine runner to which the driving power is transmitted through a working fluid from the pump impeller, a stator disposed between the pump impeller and the turbine runner and supported on a transmission case via a one-way clutch and having stator blades, and a ratio W/D of a stator-blade axial length W of the stator to a torque-converter nominal diameter D of the torque converter being set to satisfy a predetermined necessary condition that a decrease rate of a stall torque ratio with respect to a peak torque ratio at stall is less than or equal to 1%. The torque-converter nominal diameter D means an outside diameter of the pump impeller and the turbine runner. It is preferable that the predetermined necessary condition is represented by an inequality $A \leq W/D \leq B$, where A is a lower limit of the ratio W/D, obtained when a rate of change in the stall torque ratio reduces to 1% in accordance with a decrease in the ratio W/D from a peak point corresponding to the peak torque ratio, whereas B is an upper limit of the ratio W/D, obtained when the rate of change in the stall torque ratio reduces to 1% in accordance with an increase in the ratio W/D from the peak point corresponding to the peak torque ratio. More preferably, the lower limit A may be set to 0.030 and the upper limit B maybe set to 0.052, and the predetermined necessary condition may be represented by the inequality $0.030 \leq W/D \leq 0.052$. Additionally, within a set range defined by the inequality $0.030 \leq W/D \leq 0.052$, an aerofoil section of the stator blade of the torque converter may be gradually down-sized as a similar geometrical figure from an aerofoil section of the stator blade of the torque converter having a stator-blade axial length corresponding to the ratio $W/D=0.030$ to an aerofoil section of the stator blade of the torque converter having a stator-blade axial length corresponding to the ratio $W/D=0.052$.

The other objects and features of this invention will become understood from the following description with reference to the accompanying drawings.

DESCRIPTION OF THE PREFERRED EMBODIMENTS

Figure 1:
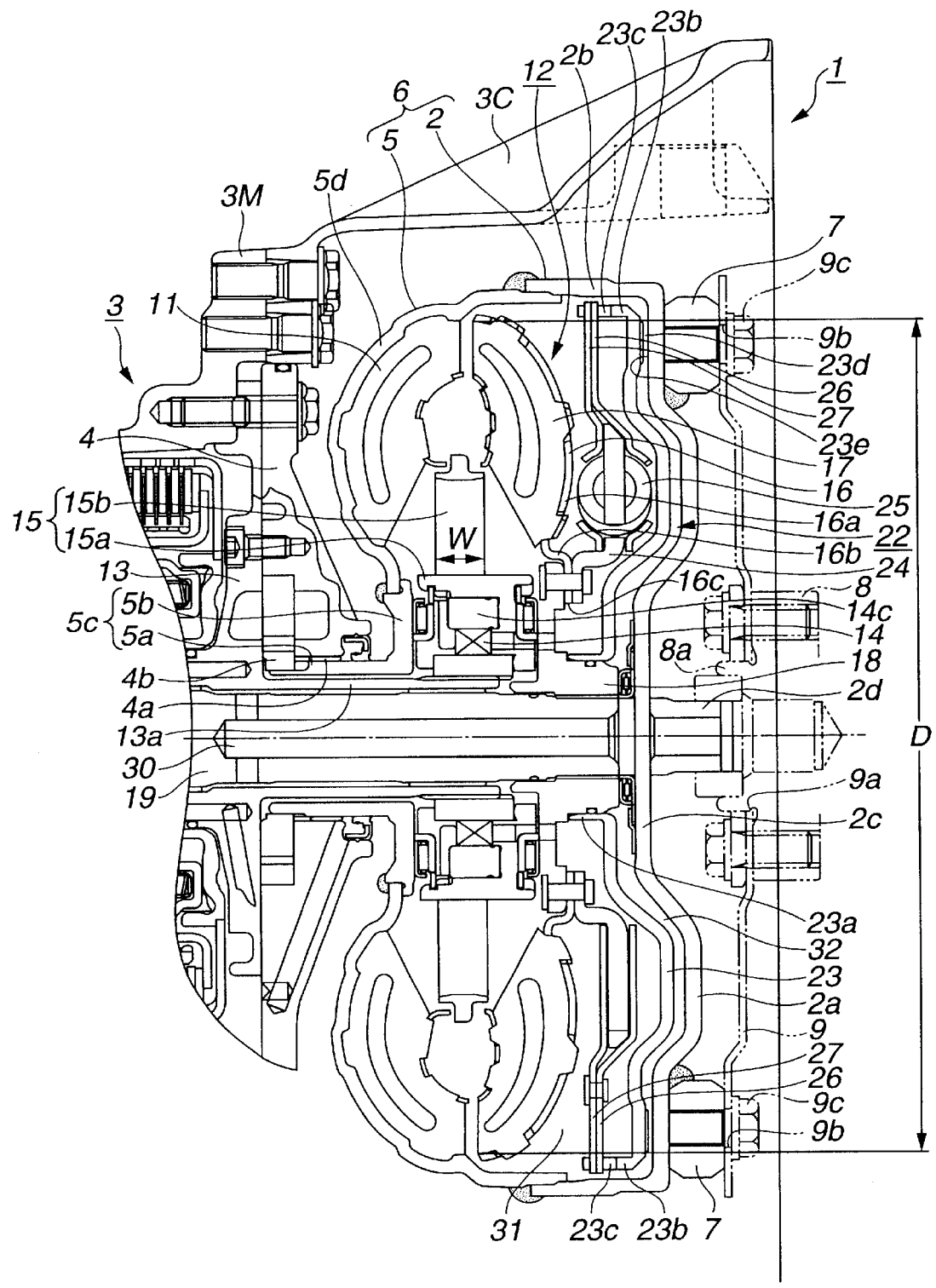
FIG. 1 is a longitudinal cross-sectional view illustrating a torque converter of the embodiment.

Referring now to the drawings, particularly to FIG. 1, a torque converter 1 of the embodiment is exemplified in a lock-up clutch equipped torque converter. Torque converter 1 includes a converter cover 6 (a two-piece stamped metal shell) that is constructed by a front cover 2 and a rear cover 5 welded together. Front cover 2 is fixedly connected to a driving power source such as an internal combustion engine. Rear cover 5 is rotatably supported by an oil pump case 4 that is attached to the front-end face of a transmission case 3M of an automatic transmission 3. In FIG. 1, reference sign 3C denotes a converter housing. Front cover 2 is comprised of a forward disk-shaped portion 2a and a peripheral cylindrical portion 2b axially extending from the outer periphery of forward disk-shaped portion 2a. As clearly seen from the cross section of FIG. 1, forward disk-shaped portion 2a is formed with a central backwardly recessed portion 2c. An axially forward extending cylindrical hollow shaft portion 2d is formed at the center position of central backwardly recessed portion 2c. Circumferentially equidistant spaced, four weld nuts 7 are fixed onto the perimeter of forward disk-shaped portion 2a so as to connect the converter cover to the driving power source (the engine). In more detail, as can be appreciated from the two-dotted line in the cross section of FIG. 1, converter cover 6 is fixedly connected to an engine crankshaft 8 via a first drive plate 9 serving as a coupling member between the converter cover and engine crankshaft. First drive plate 9 is formed at its center with an insertion hole 9a into which an axially-protruding portion 8a of crankshaft 8 is fitted. Under a condition wherein axially-protruding portion 8a and insertion hole 9a are fitted to each other, the peripheral portion of first drive plate 9 close to insertion hole 9a is bolted to the rear end of crankshaft 8. First drive plate 9 is also formed with four mounting bolt holes 9b that are opposite to the respective weld nuts 7. First drive plate 9 is integrally connected to front cover 2 of converter cover 6 by securely screwing bolts 9c into the respective weld nuts 7. On the other hand, rear cover 5 is comprised of an inner member 5c having a L-shaped cross section and a torus-shaped outer member 5d. Inner and outer members 5c and 5d are welded together. Inner member 5c is constructed by an axially-extending cylindrical-hollow portion 5a and a radially-extending flanged portion 5b. Cylindrical-hollow portion 5a is rotatably supported by oil pump case 4. Flanged portion 5b is formed integral with cylindrical-hollow portion 5a in such a manner as to radially extend from the front end of cylindrical-hollow portion 5a. The inner periphery of torus-shaped outer member 5d is welded to the outer periphery of flanged portion 5b of L-shaped inner member 5c, whereas the outer periphery of torus-shaped outer member 5d is fitted to the inner peripheral wall surface of peripheral cylindrical portion 2b of front cover 2 and welded to the front cover by way of welding. Cylindrical-hollow portion 5a of L-shaped inner member 5c is rotatably supported on oil pump case 4 through a bushing 4a. The rear end portion of cylindrical hollow portion 5a of inner member 5c is connected to the inner periphery of an oil pump 4b that is accommodated in oil pump case 4, by way of spline connection. A plurality of impeller blades of a pump impeller 11 are attached to the inner peripheral wall surface of outer member 5d of rear cover 5. A plurality of turbine blades of a turbine runner 12 are provided in converter cover 6 so that the turbine blades 17 are opposite to the respective impeller blades of pump impeller 11. A stator 15 is located at the inner portion of torque converter 1 and disposed between pump impeller 11 and turbine runner 12. Stator 15 serves as a reactor that redirects working oil flow from turbine runner 12 to boost pump-impeller action and multiplies engine torque. Turbine runner 12 is comprised of a turbine shell 16, turbine blades 17, and a turbine hub 18. Turbine blades 17 are attached to the inner peripheral wall surface of turbine shell 16. Turbine hub 18 supports the inner peripheral portion of turbine shell 16. Turbine hub 18 is splined to a rotating shaft 19 (or an automatic transmission input shaft) that is rotatably supported by transmission case 3M. Turbine shell 16 is comprised of a main torus-shaped portion 16a formed integral with turbine blades 17, a substantially cylindrical portion 16b having a slight axial length, and a substantially annular innermost mounting portion 16c. Cylindrical portion 16b is integrally formed with main torus-shaped portion 16a in a manner so as to slightly extend forwards from the inner periphery of main torus-shaped portion 16a in the axial direction. As viewed from the cross section of FIG. 1, annular innermost mounting portion 16c is integrally formed with cylindrical portion 16b in a manner so as to be bent radially inwards from the forward end of cylindrical portion 16b. Stator 15 is installed on a cylindrical hollow support portion 13a through a one-way clutch 14. Cylindrical hollow support portion 13a is formed integral with an oil pump cover 13 and constructs part of transmission case 3M. Oil pump cover 13 is fitted and bolted to the rear face of oil pump case 4 to hermetically cover the rear end of oil pump case 4.

Stator 15 is comprised of a stator hub 15a and a plurality of stator blades 15b. Stator hub 15a is fixedly connected to an outer race 14c of one-way clutch 14. Stator blades 15b are attached onto the outer periphery of stator hub 15a. In the torque converter of the embodiment, note that a ratio W/D of a stator-blade axial length W to a nominal diameter D of torque converter 1 (that is, an outside diameter of pump impeller 11 and turbine runner 12) is set to satisfy the following inequality (1).

$$0.030 \leq W/D \leq 0.052 \tag{1}$$

Figure 2:
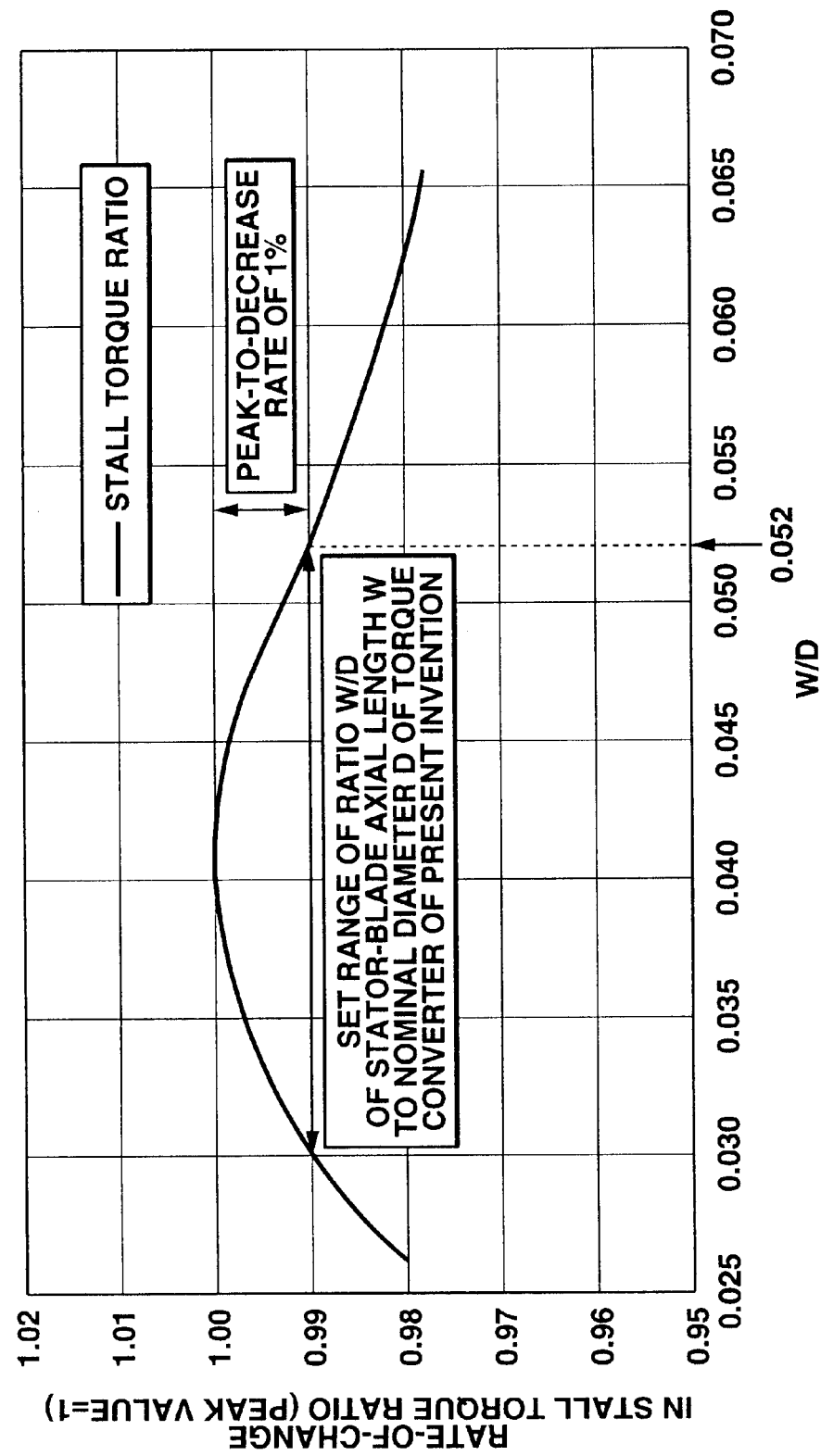
FIG. 2 is a characteristic curve showing the relationship between a ratio W/D of a stator-blade axial length W to a nominal diameter D of the torque converter of FIG. 1 and a rate-of-change in a stall torque ratio.

In setting of the aforementioned ratio W/D, the greater the ratio W/D is set, the longer the stator-blade axial length W can become. Conversely, the smaller the ratio W/D is set, the shorter the stator-blade axial length W can become. The stator-blade axial length W must be optimally set or specified with regard to the nominal diameter D of torque converter 1 for the following reason. Breakaway burble and energy loss occurring within the torque converter are greatly affected by a flow velocity of working oil (working fluid) flowing through turbine blades 17. The flow velocity of working oil flow is mainly determined depending on the nominal diameter D of torque converter 1. That is, nominal diameter D of torque converter 1 can be regarded as a control parameter closely related to the breakaway burble and energy loss occurring within the converter. As appreciated from the inequality (1), it is preferable to set the lower limit of the ratio W/D at 0.030 and to set the upper limit of the ratio W/D at 0.052, for the following reason. As can be appreciated from the ratio W/D versus stall-torque-ratio rate-of-change characteristic curve of FIG. 2, the maximum stall torque ratio is obtained nearby a point of W/D=0.040. In FIG. 2, the rate of change in the stall torque ratio represents a rate of change in a stall torque ratio obtained at stall wherein a speed ratio e (=Vt/Vp) of a rotational speed Vt (output speed) of turbine runner 12 to a rotational speed Vp (input speed) of pump impeller 11 is substantially "0" (e≈0). As seen from the characteristic curve of FIG. 2, the rate of change in the stall torque ratio tends to reduce, as the ratio W/D gradually decreases from the point of W/D=0.040. When the ratio W/D becomes less than 0.030, that is, the stator-blade axial length W of stator 15 becomes excessively shorter, an outlet slip angle becomes undesirably greater and thus a decrease rate of the stall torque ratio with respect to a peak torque ratio (hereinafter is referred to as a "peak-to-decrease rate") exceeds 1%. This lowers the startability of the vehicle. In a similar manner, the rate of change in the stall torque ratio tends to reduce, as the ratio W/D gradually increases from the point of W/D=0.040. When the ratio W/D becomes greater than 0.052, that is, the stator-blade axial length W of stator 15 becomes excessively longer, the stator blade area becomes undesirably wider, thus increasing the fluid frictional loss on the stator blade surface. As a result of the increased fluid frictional loss (or increased internal energy loss in the torque converter), the peak-to-decrease rate exceeds 1%. This also results in the lowered start ability. For the reasons set out above, it is very important to optimally set the ratio W/D of stator-blade axial length W to nominal diameter D of torque converter 1 and additionally it is preferable to set the upper and lower limits of the ratio W/D within a predetermined range defined by the previously-noted inequality (1), so as to enhance the vehicle's startability, while keeping the stall torque ratio near to the peak torque ratio.

Figure 3:
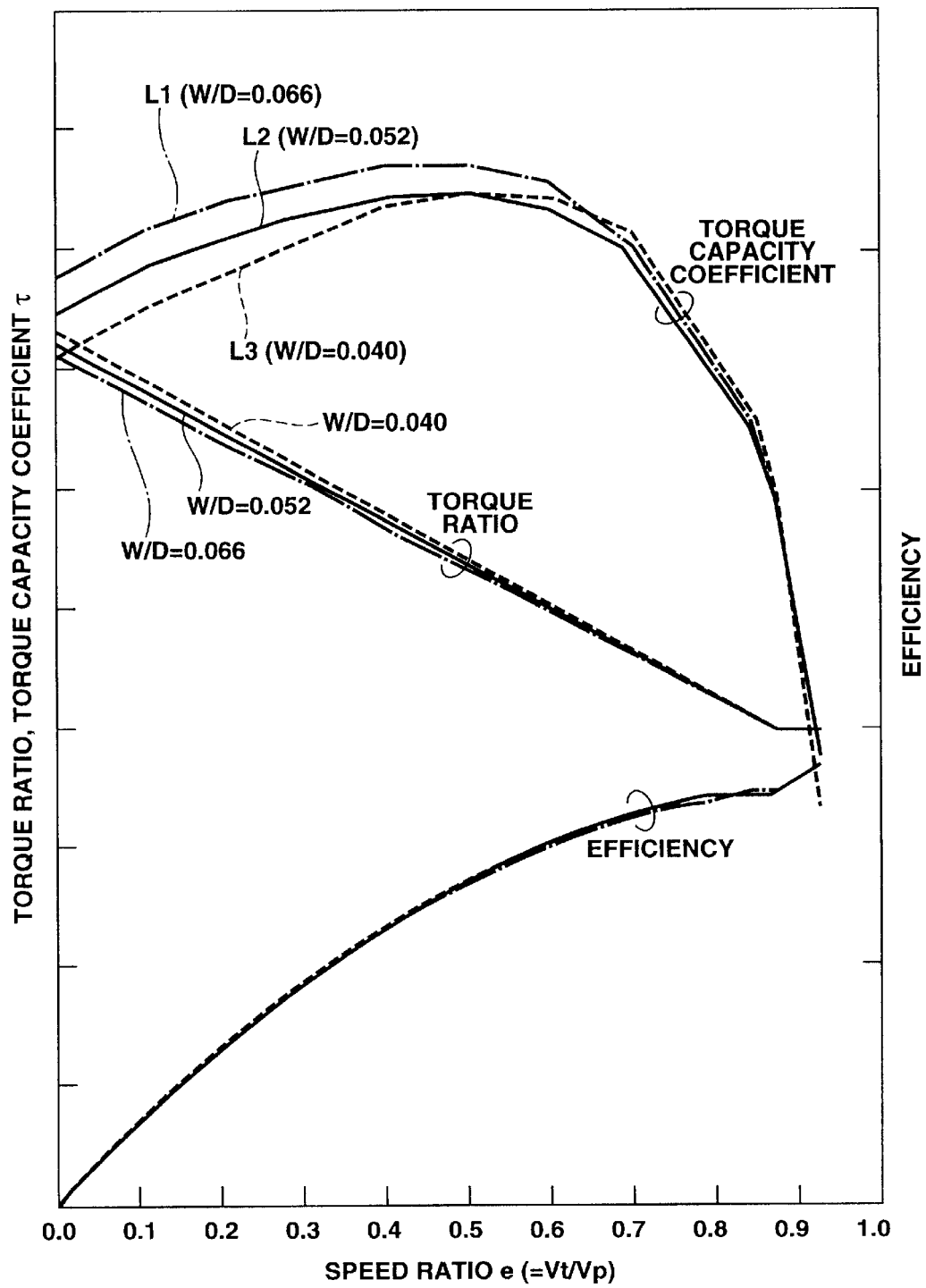
FIG. 3 shows characteristic curves explaining the relationship among a torque capacity coefficient τ, a torque ratio, a speed ratio e (=Vt/Vp) and a converter efficiency, at three different ratios W/D, namely W/D=0.040, W/D=0.052, and W/D=0.066.
Figure 4A:
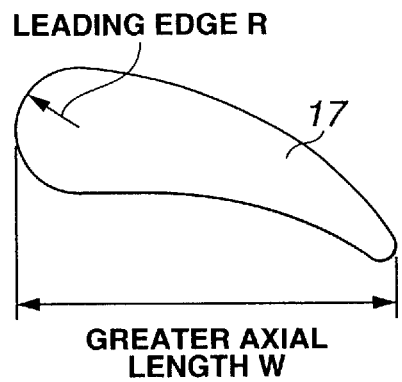
FIGS. 4A, 4B, and 4C are explanatory views showing how the torque capacity coefficient τ is affected by the stator-blade axial length W or the radius-of-curvature R of the stator-blade leading edge.
Figure 4B:
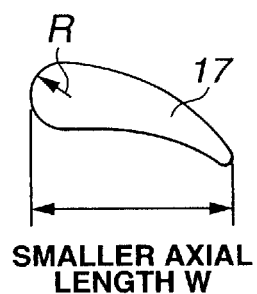
Figure 4C:
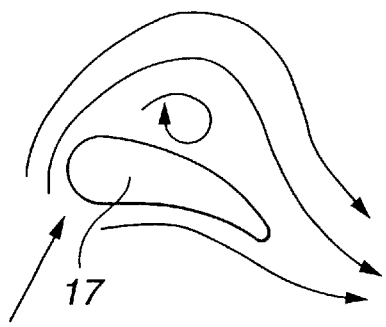

Referring now to FIG. 3, there are shown the characteristic diagrams showing the relationship among speed ratio e (=Vt/Vp), a torque capacity coefficient τ, the torque ratio, and a converter efficiency, at three different values of the ratio W/D serving as a control parameter, namely W/D= 0.040, W/D=0.052, and W/D=0.066. In a conventional torque converter, the ratio W/D of stator-blade axial length W to torque-converter nominal diameter D is often set at 0.066. In the characteristic diagrams of FIG. 3, the one-dotted line indicates the characteristics (the torque ratio, torque capacity coefficient τ, and converter efficiency) of the conventional torque converter of W/D=0.066. The solid line indicates the characteristics (the torque ratio, torque capacity coefficient τ, and converter efficiency) of the torque converter of the embodiment whose ratio W/D is set at 0.052 included in the predetermined range defined by 0.030≦W/D≦0.052. The broken line indicates the characteristics (the torque ratio, torque capacity coefficient τ, and converter efficiency) of the torque converter of the embodiment whose ratio W/D is set at 0.040 included in the predetermined range defined by 0.030≦W/D≦0.052 and capable of providing the peak torque ratio. In case of the conventional torque converter of W/D=0.066, as seen from the characteristic curve L1 indicated by the one-dotted line of FIG. 3, the torque capacity coefficient τ at stall becomes comparatively greater. In case of the torque converter of the embodiment of W/D=0.052, as seen from the characteristic curve L2 indicated by the solid line of FIG. 3, the torque capacity coefficient τ at stall can be adequately lowered, when compared to the conventional torque converter of W/D= 0.066. As can be appreciated from comparison between the characteristic curve L3 indicated by the broken line and the characteristic curve L2 indicated by the solid line of FIG. 3, the stall torque capacity coefficient τ obtained by the torque converter of the embodiment of W/D=0.040 can be further lowered rather than the torque converter of the embodiment of W/D=0.052. As discussed above, according to the torque converter of the embodiment, it is possible to relatively effectively lower the torque capacity coefficient τ at stall, in comparison with the conventional torque converter of W/D= 0.066, for the reasons set out below. As shown in FIGS. 4A and 4B, in manufacturing turbine blades 17 or stator blades 15b, an aerofoil section of turbine blade 17 or stator blade 15b having a relatively long axial length W (see FIG. 4A) and an aerofoil section of turbine blade 17 or stator blade 15b having a relatively short axial length W (see FIG. 4B) are usually designed and dimensioned as similar geometrical figures. Therefore, shortening the stator-blade axial length or the turbine-blade axial length reduces a radius-of-curvature R of the leading edge of stator blade 15b or a radius-of-curvature of the leading edge of turbine blade 17. When the turbine is in stall, such a relatively smaller radius-of-curvature R of the stator-blade leading edge or such a relatively smaller radius-of-curvature of the turbine-blade leading edge ensures a more smooth breakaway phenomenon wherein the working oil can be more smoothly broken away the stator blade surface or the turbine blade surface owing to vortex flow occurring on the back face of the blade (see FIG. 4C). As a whole, the flow rate of working oil tends to decrease and thus the torque capacity coefficient τ at stall tends to decrease. As can be seen from the lower three different characteristic curves of FIG. 3 showing the converter efficiencies (or the torque-converter power transmission efficiencies) respectively obtained at W/D=0.040, W/D=0.052, and W/D=0.066, it is possible to slightly increase the converter efficiency of the torque converter of a comparatively shorter stator-blade axial length (W/D= 0.040 or W/D=0.052) by setting the torque ratio at stall (e≈0) at a relatively greater value, when compared to the torque converter of a comparatively longer stator-blade axial length (W/D=0.066). However, as can be appreciated from the three different characteristic curves concerning the converter efficiency have almost the same characteristics all over the speed ratio e ranging from 0.0 to 1.0, regardless of variations in the ratio W/D, such as 0.040, 0.052, and 0.066. The previously-noted torque capacity coefficient τ is proportional to the magnitude of input torque transmitted to the torque converter and inversely proportional to a square of input rotational speed of the torque converter. Thus, torque capacity coefficient τ is represented by the equation τ=Ti/Ni², where Ti denotes the magnitude of torque-converter input torque, and Ni² denotes the square of torque-converter input rotational speed. As discussed previously, in the torque converter of the embodiment, the ratio W/D of stator-blade axial length W to torque-converter nominal diameter D is set to satisfy the inequality 0.030≦W/D≦0.052. Generally, input rotational speed Ni of torque converter 1 is set or adjusted to a substantially constant speed (a designated low speed) with the engine at an idle rpm. On the assumption that input rotational speed Ni of the torque converter is regarded as a fixed value at stall when driving the automatic transmission with the vehicle stationary, torque-converter input torque Ti is mainly dependent upon the torque capacity coefficient τ (see the inequality τ=Ti/Ni², that is, Ti=τ·Ni²). As clearly seen from comparison of the characteristic curves L1 (W/D=0.066), L2 (W/D=0.052), and L3 (W/D=0.040) of FIG. 3, the torque capacity coefficient τ (at and near stall) of torque converter 1 having the ratio W/D defined by 0.030≦W/D≦0.052 is set to be lower than that of the conventional torque converter having the ratio W/D=0.066. The relatively lower setting of torque capacity coefficient τ at and near stall contributes to an effective decrease in torque-converter input torque Ti. The effective decrease in torque-converter input torque Ti at and near stall, in other words, during idling, contributes to a reduction in engine load, thus improving fuel economy (or reducing fuel consumption) during idling.

In the shown embodiment, a lock-up clutch 22 is disposed between front cover 2 and turbine runner 12 such that the torque converter (pump and turbine elements) is automatically locked up in predetermined gear ranges to eliminate internal slippage (energy loss) and improve fuel economy. Lock-up clutch 22 includes a lock-up piston 23. Lock-up piston 23 is comprised of an inside cylindrical portion 23a and an outside cylindrical portion 23b. Inside cylindrical portion 23a of lock-up piston 23 is fitted onto (or splined to) the outer peripheral surface of the cylindrical portion of turbine hub 18, so that lock-up piston 23 is axially slidable relative to turbine hub 18 and that lock-up piston 23 rotates together with turbine hub 18. Outside cylindrical portion 23b is formed-with a plurality of circumferentially-equidistant spaced engaging grooves 23c (described later). A lock-up facing 23d is attached to the front face of lock-up piston 23 and located at a position that lock-up facing 23d faces toward weld nuts 7 of front cover 2. The inner peripheral wall surface of front cover 2, facing to lock-up facing 23d is formed as a flat surface 23e perpendicular to the axis of rotating shaft 19 (automatic transmission input shaft). Lock-up clutch 22 also includes a lock-up clutch hub 24 whose inside annular portion is fixedly connected to turbine hub 18 by way of riveting, for example. A second drive plate 26 is mechanically linked to the outside edged portion of clutch hub 24 via a damper spring 25. Reference sign 27 denotes a side plate that is integrally connected to second drive plate 26. Outside ends of second drive plate 26 and side plate 27 are slidably fitted into and engaged with respective circumferentially-equidistant spaced engaging grooves 23c of outside cylindrical portion 23b of lock-up piston 23.

The torque converter of the embodiment operates as follows. In a particular state wherein the vehicle is stopped and the engine is idling at an idle rpm, a lubricating oil, having a slightly higher pressure level than a pressure level of lubricating oil filling up a pump and turbine accommodating chamber 31, is supplied into a lubricating oil passage 30 bored in rotating shaft 19. Pump and turbine accommodating chamber 31 accommodates therein pump impeller 11 and turbine runner 12. Fluid pressure in the lubricating oil (or working oil) in pump and turbine accommodating chamber 31 is applied to the rear face of lock-up piston 23. Under the previously-noted particular state, the relatively higher-pressure lubricating oil in lubricating oil passage 30 is supplied into a lubricating oil chamber 32 defined between disk-shaped portion 2a of front cover 2 and the front face of lock-up piston 23. With the lapse of time, the lubricating oil supplied into lubricating oil chamber 32 flows through a flow-constriction orifice portion, which is defined between the outer periphery of lock-up piston 23 and the peripheral cylindrical portion 2b of front cover 2, towards pump and turbine accommodating chamber 31 opposite to lubricating oil chamber 32. As may be appreciated from the above, in the previously-noted particular state, lock-up facing 23d is held spaced apart from flat surface 23e of front cover 2 (see a slight space defined between the lock-up facing and the front-cover flat surface in FIG. 1), owing to the relatively higher lubricating oil pressure in lubricating oil chamber 32. This is called "lock-up clutch disengagement state". In the lock-up clutch disengagement state and in the particular state wherein the vehicle is stopped and the engine is idling at an idle rpm, driving power is transmitted through first drive plate 9 (the coupling member between the converter cover and engine crankshaft) and weld nuts 7 into front cover 2. Driving torque is then transmitted through rear cover 5 formed integral with front cover 2 into pump impeller 11. As a result, rotational motion of pump impeller 11 is converted into kinetic energy of lubricating oil (working oil) filling up pump and turbine accommodating chamber 31 of converter cover 6. In the previously-noted particular state, the rotating shaft 19 of automatic transmission 3 is held at its stopped state, and therefore the turbine is maintained at stall when turbine runner 12 is stopped and pump impeller 11 is turning as fast as the engine crankshaft will drive it. At this time, the torque transferred to converter cover 6 is transmitted through cylindrical-hollow portion 5a of inner member 5c of rear cover 5 into oil pump 4b of automatic transmission 3 to cause rotational motion of the oil pump. As set forth above, when the turbine of torque converter 1 is in stall with the engine at an idle rpm, the working oil (lubricating oil) in pump and turbine accommodating chamber 31 is pumped from the pump impeller blades across to turbine blades 17, then back to pump impeller 11 via stator blades 15b of stator 15 to provide oil circulation passage and to ensure torque transmission from the pump impeller to the turbine runner.

As will be appreciated from the above, in the torque converter of the embodiment, the ratio W/D of stator-blade axial length W to torque-converter nominal diameter D is set to satisfy the inequality $0.030 \leq W/D \leq 0.052$. Thus, it is possible to maintain the stall torque ratio at a relatively high level and to prevent the peak-to-decrease rate from exceeding 1% (see FIG. 2). This enhances the vehicle's startability. In addition to the above, according to the torque converter of the embodiment, the torque capacity coefficient $\tau$ at idle (or at stall) is set at a relatively smaller value than that of the conventional torque converter of W/D=0.066, for instance. Thus, it is possible to improve fuel economy at idle (or to reduce fuel consumption at idle).

When switching from the vehicle's stopped state to the vehicle's starting state, rotating shaft 19 is shifted from its stopped state to its rotatable state. Thus, turbine runner 12 shifts from the stopped state to the rotating state and begins to rotate by way of the kinetic energy of lubricating oil obtained owing to rotation of pump impeller 11. In this manner, when the turbine runner starts to rotate from the engine's idling state, the torque converter of the embodiment can maintain the torque ratio at and near stall at a relatively higher level. This effectively enhances the vehicle's startability. After this, when the vehicle speed gradually increases and the turbine runner speed approaches the pump impeller speed and then speed ratio e reaches approximately "1", the pressure level of lubricating oil in lubricating oil passage 30 is controlled to a relatively lower pressure level than that of pump and turbine accommodating chamber 31 responsively to a lock-up command signal from an electronic transmission control system (not shown) often abbreviated to "ECT". As a result of this, the lubricating oil in lubricating oil chamber 32 is returned into lubricating oil passage 30 bored in rotating shaft 19, and thus the pressure level of lubricating oil in lubricating oil chamber 32 becomes relatively lower than the pressure level of lubricating oil in pump and turbine accommodating chamber 31. This allows lock-up facing 23d of lock-up piston 23 to axially slide into contact with flat surface 23e of front cover 2 to cause a great frictional force between them. In this manner, torque converter 1 is automatically locked up by engaging lock-up clutch 22 in response to the lock-up command signal from the electronic transmission control system (not shown). Therefore, in the lock-up clutch engagement state, the driving torque transferred into front cover 2 of converter cover 6, is transmitted through lock-up piston 23, first drive plate 26, side plate 27, damper spring 25, and turbine hub 18 directly into rotating shaft 19.

In the shown embodiment, the torque converter is exemplified in a so-called lock-up torque converter with lock-up clutch 22. The lock-up torque converter is conventional and forms no part of the present invention. Thus, lock-up clutch 22 may be omitted. Torque converter 1 of the embodiment is driven by a crankshaft of an internal combustion engine serving as a driving power source. The other driving power source, such as an electric motor or an electric motor/generator for use in an electric vehicle or a hybrid vehicle, may be used instead of the engine.

The entire contents of Japanese Patent Application No. P2001-303912 (filed Sep. 28, 2001) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A torque converter comprising:
    a converter cover to which a driving power is transmitted from a driving power source;
    a pump impeller formed integral with the converter cover;
    a turbine runner to which the driving power is transmitted through a working fluid from the pump impeller;
    a stator disposed between the pump impeller and the turbine runner and supported on a transmission case via a one-way clutch and having stator blades; and
    a ratio W/D of a stator-blade axial length W of the stator to a torque-converter nominal diameter D of the torque converter being set to satisfy a predetermined inequality $0.030 \leq W/D \leq 0.052$.

2. The torque converter as claimed in claim 1, wherein:
    the torque-converter nominal diameter D is an outside diameter of the pump impeller and the turbine runner.

3. A torque converter comprising:
    a converter cover to which a driving power is transmitted from a driving power source;
    a pump impeller formed integral with the converter cover;
    a turbine runner to which the driving power is transmitted through a working fluid from the pump impeller;
    a stator disposed between the pump impeller and the turbine runner and supported on a transmission case via a one-way clutch and having stator blades; and
    a ratio W/D of a stator-blade axial length W of the stator to a torque-converter nominal diameter D of the torque converter being set to satisfy a predetermined necessary condition that a decrease rate of a stall torque ratio with respect to a peak torque ratio at stall is less than or equal to 1%.

4. The torque converter as claimed in claim 3, wherein:
    the torque-converter nominal diameter D is an outside diameter of the pump impeller and the turbine runner.

5. The torque converter as claimed in claim 3, wherein:
    the predetermined necessary condition is represented by an inequality $A \leq W/D \leq B$, where A is a lower limit of the ratio W/D, obtained when a rate of change in the stall torque ratio reduces to 1% in accordance with a decrease in the ratio W/D from a peak point corresponding to the peak torque ratio, and B is an upper limit of the ratio W/D, obtained when the rate of change in the stall torque ratio reduces to 1% in accordance with an increase in the ratio W/D from the peak point corresponding to the peak torque ratio.

6. The torque converter as claimed in claim 5, wherein:
    the lower limit A is set to 0.030 and the upper limit B is set to 0.052, and the predetermined necessary condition is represented by the inequality $0.030 \leq W/D \leq 0.052$.

7. The torque converter as claimed in claim 6, wherein:
    within a set range defined by the inequality $0.030 \leq W/D \leq 0.052$, an aerofoil section of the stator blade of the torque converter is gradually down-sized as a similar geometrical figure from an aerofoil section of the stator blade of the torque converter having a stator-blade axial length corresponding to the ratio W/D=0.030 to an aerofoil section of the stator blade of the torque converter having a stator-blade axial length corresponding to the ratio W/D=0.052.

* * * * *